US010940406B2

(12) United States Patent
Ghadyani

(10) Patent No.: US 10,940,406 B2
(45) Date of Patent: Mar. 9, 2021

(54) APPARATUS AND METHOD FOR IMPROVED PHASE SEPARATION IN IMMISCIBLE FLUIDS

(71) Applicant: Mohammad Ghadyani, Tehran (IR)

(72) Inventor: Mohammad Ghadyani, Tehran (IR)

( * ) Notice: Subject to any disclaimer, the term of this patent is extended or adjusted under 35 U.S.C. 154(b) by 60 days.

(21) Appl. No.: 16/571,159

(22) Filed: Sep. 15, 2019

(65) Prior Publication Data
US 2020/0155969 A1     May 21, 2020

(51) Int. Cl.
| | |
|---|---|
| *B01D 17/12* | (2006.01) |
| *B01D 17/02* | (2006.01) |
| *C02F 1/40* | (2006.01) |
| *C02F 1/00* | (2006.01) |
| *C02F 103/32* | (2006.01) |
| *C02F 103/36* | (2006.01) |
| *C02F 103/16* | (2006.01) |
| *C02F 103/12* | (2006.01) |

(52) U.S. Cl.
CPC ......... *B01D 17/12* (2013.01); *B01D 17/0214* (2013.01); *C02F 1/008* (2013.01); *C02F 1/40* (2013.01); *C02F 2103/12* (2013.01); *C02F 2103/16* (2013.01); *C02F 2103/32* (2013.01); *C02F 2103/365* (2013.01); *C02F 2209/01* (2013.01); *C02F 2209/40* (2013.01); *C02F 2209/42* (2013.01)

(58) Field of Classification Search
None
See application file for complete search history.

(56) References Cited

U.S. PATENT DOCUMENTS

| | | | |
|---|---|---|---|
| 2012/0186560 A1* | 7/2012 | Lund | F02D 41/0027 123/495 |
| 2016/0367912 A1* | 12/2016 | Kennedy | E02B 15/045 |

* cited by examiner

*Primary Examiner* — Richard C Gurtowski

(57) ABSTRACT

An apparatus and method for automated decantation of multi-phase fluid is disclosed. The apparatus for two phase fluid comprises a fluid line assembly, a floating marker, a sensor, an actuator assembly and a control board. The fluid line is attached to a reservoir containing the multi-phase fluid, comprising an inlet and two outlets. A three-way valve is disposed between the inlet and the two outlets. The floating marker is disposed within a cylindrical frame mounted within the reservoir. The selective density of the float marker is selected between the density values of two fluids in the multi-phase fluid. The float-marker floats between the two fluid phases due to the density of the float marker and fluid. The actuator assembly, configured to operate inlets and outlets of the fluid line. The number of outlets, sensor, and floating marker increases with the number of phases of fluid.

2 Claims, 6 Drawing Sheets

APPARATUS AND METHOD FOR IMPROVED PHASE SEPARATION IN IMMISCIBLE FLUIDS

BACKGROUND OF THE INVENTION

Producing immiscible waste water such as water and oil is inevitable in different industries. Particularly, industries related to petroleum such as refineries' spent caustic, petroleum refining and fabricating and petrochemical products produces multiphase waste water. Some industries such as steel industry and plotting industry, glass industry, and food industry produces two-phase waste water because of utilization of oil. Additionally, oil slicks are caused by excavation and extraction, activities in oil terminals, broken pipe in pipeline transportation, broken ships and oil lorries. Hence, to reduce the damage caused to the economy and environment by the immiscible waste, a comprehensive method is needed to separate and return water/oil to the respective product line.

Generally, a separation funnel is used in liquid-liquid extractions to separate the components of a mixture into two or more phases on the basis of densities of the liquid. To use a separation funnel, the mixture to be separated is added through the top with a stopcock for closing a bottom opening. A top and a bottom tap are then opened and the lower phase is released by gravitation. A top opening must be opened while releasing a lower phase to allow pressure equalization between the inside of the funnel and the atmosphere. When the lower layer phase is removed, the stopcock is closed and an upper layer phase is poured out through the top into another container. The same method is used for industrial purposes but the containers are in large scale. The other industrial way is to use a centrifuge machine which separates the phases in high accuracy but the centrifuge machine needs too much energy and is generally too expensive.

There are a few other methods such as using de-emulsifiers or biological methods to remove or separate oil slicks and oily waste water, which are immiscible liquids from the environment. Each method has its own advantages and disadvantages and different technologies are used in each one. None of them is comprehensive and all of them have some deficiencies. Because of the of lack of desirable efficiency in industrial scale or high cost or difficulty in application, these methods are generally not used, and this causes irreparable damages to the environment.

Therefore, there is need for an apparatus and method for providing improved automatic decantation of multi-phase chemical fluid that addresses the aforementioned drawbacks.

SUMMARY OF THE INVENTION

An apparatus and method for automated decantation of multi-phase fluid is disclosed. In one embodiment, an apparatus for automated decantation of multi-phase fluid having two phase fluid is disclosed. The apparatus comprises a fluid line assembly, a floating marker, a sensor, an actuator assembly and a control board. The fluid line is attached to a reservoir containing the multi-phase fluid, comprising an inlet and at least two outlets. A three-way valve is disposed between the inlet and the at least two outlets.

The floating marker is disposed within a cylindrical frame mounted within the reservoir. The cylindrical frame is configured to enable the floating marker to move vertically, the floating marker is of a selective density. The cylindrical frame is designed to make the float marker move vertically in a determined part. In one embodiment, the cylindrical frame could be manufactured in any shape.

The sensor is disposed in proximity to a bottom portion of the cylindrical frame. The sensor further comprises a reed switch. The sensor is disposed at an exterior side of the reservoir. In one embodiment, the reservoir is at least one of separating container or container. The control board further comprises a timer switch.

In one embodiment, the selective density of the float marker is selected on the basis of densities of two fluids in the multi-phase fluid mixture. The selective density of the float marker is selected between the density values of two fluids in the multi-phase fluid. Due to the density of the float marker and fluid, the float marker floats between the two fluid phases.

In one embodiment, the actuator assembly comprises at least two actuators. The at least two actuator comprises a first actuator and a second actuator. The first actuator is configured to control opening and closing of the inlet. The second actuator is configured to control opening and closing of the at least two outlets.

In another embodiment, the actuator assembly comprises at least one actuator to control opening and closing of the inlet and at least two outlets. In yet another embodiment, the actuator assembly comprises an actuating component. In one embodiment, the actuating component comprises a motor housing encompassing an electric motor. The electric motor is disposed on a motor holder. The actuating component further comprises one or more limit switches supported by a limit switch holder.

In one embodiment, a method for automated decantation of multi-phase fluid is disclosed. In one embodiment, the multi-phase fluid is filled in the reservoir and wait for a stay period. The stay period is maximum time for separation of the multi-phase fluid mixture into individual fluids on the basis of density. The fluid is separated into different phases.

In one embodiment, colloid or emulsion liquid could be coagulated and separated into phases using common methods such as applying chemical emulsifiers or diffusers. The fluid of first phase is evacuated via the first outlet. During evacuation of the fluid of first phase, the float marker towards the sensor. When the float comes in line with the sensor, the sensor activates the actuation assembly to open the second outlet and close the first outlet. But the actuation assembly are activated sooner than the time when the first phase is evacuated completely, hence the delay element starts to operate, when the float marker comes in line with the sensor.

The delay element is configured to calculate error time. The opening of the second outlet and the closing of the first outlet is delayed for the calculated error time, to ensure complete evacuation of fluid of first phase and to increase accuracy. After completion of the error time, the second outlet is opened for evacuation of fluid of second phase.

In one embodiment, an apparatus for automated decantation of multi-phase fluid having three phase fluid is disclosed. The apparatus comprises a fluid line assembly, at least two floating markers, at least two vertical frames, at least two sensors, an actuating assembly including an actuating component, an electric board or a control board comprising a delay element, and a timer switch. The fluid line assembly is attached to a reservoir containing the multi-phase fluid, comprising an inlet and at least three outlets.

In one embodiment, the at least three outlet comprises a first outlet, a second outlet and a third outlet. The first outlet is configured to receive a first phase fluid, the second outlet is configured to receive a second phase fluid and the third outlet is configured to receive a third phase fluid.

In one embodiment, the fluid line assembly comprises a three-way valve disposed between the inlet and the at least three outlets. At least one floating marker is disposed within the at least one vertical frame. At least one sensor is disposed in proximity to a bottom portion the at least one vertical frame. The at least one sensor is disposed at the exterior side of the separating container. In one embodiment, the cylindrical frame is designed to make the float marker move vertically in a determined part. In one embodiment, the cylindrical frame could be manufactured in any shape.

The at least one sensor is disposed in proximity to a bottom portion of the cylindrical frame. The sensor further comprises a reed switch. The sensor is disposed at an exterior side of the reservoir. In one embodiment, the reservoir is at least one of separating container or container. In one embodiment, the control board further comprises a timer switch.

In one embodiment, the selective density of the float marker is selected on the basis of densities of three fluids in the multi-phase fluid mixture. The at least two float marker comprises a first float marker and a second float marker. The selective density of the first float marker is selected between the density values of first two consecutive fluids in the multi-phase fluid, and the selective density of the second float marker is selected between the density values of second two consecutive fluids in the multi-phase fluid. Due to the density of the float marker and fluid, the first float marker floats between a first fluid phase and a second fluid phase. The second float marker floats between a third fluid phase and the second fluid phase.

In one embodiment, the number of float and the sensor increases with the increase with the number of phases to be separated. An example for the number of floating needed in a three-phase separation: $d=m/v$, where d phase (3)<d the second floating 2<d phase (2)<d the first floating 1<d phase (1). The above-mentioned equation can be used to calculate the density of floating in all systems. The density of the floating should make the floating stay between those phases.

In one embodiment, the actuator assembly comprises at least three actuators. The at least three actuator comprises a first actuator, a second actuator and a third actuator. The first actuator is configured to control opening and closing of the inlet. The second actuator and the third actuator are configured to control the opening and closing of the at least three outlets.

In another embodiment, the actuator assembly comprises at least one actuator to control opening and closing of the inlet and at least three outlets. In yet another embodiment, the actuator assembly comprises an actuating component to control opening and closing of the inlet and at least three outlets. In one embodiment, the actuating component comprises a motor housing encompassing an electric motor. The electric motor is disposed on a motor holder. The actuating component further comprises one or more limit switches supported by a limit switch holder. In one embodiment, the apparatus further comprises a pump to evacuate fluid from the reservoir through pumping. In some industries it's more economic to do separation in their waste water basins, hence fluid phase could be evacuated through pumping from basins.

In one embodiment, a method for automated decantation of multi-phase fluid is disclosed. In one embodiment, the multi-phase fluid is filled in the reservoir and wait for a stay period. The stay period is maximum time for separation of the multi-phase fluid mixture into individual fluids on the basis of density. The fluid is separated into different phases. The first actuator is actuated after a stay period. The actuation of the first actuator results in opening of the first inlet. The first outlet is opened using the second actuator. The first fluid phase is disposed and collected through the first outlet into a first storage tank.

The position of the first float marker placed inside the container is detected through the at least one respective sensor. An error time is estimated through a delay element connected control board. The error time is a delay period for which the first outlet valve is kept open to assure complete draining of the first fluid phase.

In one embodiment, the first outlet is closed, and the second outlet is opened through the second actuator. The second fluid phase is disposed and collected through the second outlet into a second storage tank. The position of a second float marker placed inside the container is detected through at least one respective sensor. An error time is estimated through a delay element connected control board, wherein the error time is a delay period for which the second outlet is kept open to assure complete draining of the second fluid phase. The second outlet is closed, and the third outlet is opened through a third actuator. The third fluid phase is disposed and collected through the third outlet valve into a third storage tank.

One aspect of the present disclosure is an apparatus for automated decantation of a multi-phase fluid, comprising: a) a fluid line assembly attached to a reservoir containing the multi-phase fluid, comprising an inlet and at least two outlets; b) a floating marker disposed within a cylindrical frame mounted within the reservoir, wherein the cylindrical frame is configured to enable the floating marker to move vertically, and wherein the floating marker is of a selective density; c) a sensor disposed in proximity to a bottom portion of the cylindrical frame; d) an actuator assembly configured to control opening and closing of the inlet and the at least two outlets, and e) a control board having a delay element. In one embodiment, the sensor comprises a reed switch. In another embodiment, the control board further comprises a timer switch. In one embodiment, the fluid line assembly comprises a three-way valve disposed between the inlet and the at least two outlets.

In one embodiment, the selective density of the float marker is selected on the basis of densities of two fluids in the multi-phase fluid, wherein the selective density of the float marker is selected between the density values of two fluids in the multi-phase fluid. In one embodiment, the actuator assembly comprises at least two actuators, the at least two actuator comprises a first actuator and a second actuator, wherein the first actuator is configured to control opening and closing of the inlet, and wherein the second actuator is configured to control opening and closing of the at least two outlets. In another embodiment, the sensor is disposed at an exterior side of the reservoir, wherein the reservoir is at least one of separating container or container. In one embodiment, the at least two outlet comprises a first outlet and a second outlet, wherein the first outlet is configured to receive a first phase fluid and the second outlet is configured to receive a second phase fluid.

Another aspect of the present disclosure is directed to an apparatus for automated decantation of a multi-phase fluid comprising: a fluid line assembly attached to a reservoir containing the multi-phase fluid, comprising an inlet and at least three outlets; at least two cylindrical frames disposed within the reservoir; at least two floating markers, wherein the at least one floating marker is disposed within at least one cylindrical frame, wherein the at least one cylindrical frame is configured to enable the at least one floating marker to move vertically, and wherein the floating marker is of a selective density; at least one sensor disposed in proximity to a bottom portion of each cylindrical frame; an actuator assembly configured to control opening and closing of the inlet lines and the at least two outlet lines; and a control board having a delay element.

In one embodiment, the actuator assembly comprises at least three actuators, the at least three actuator comprises a first actuator, a second actuator and a third actuator, wherein the first actuator is configured to control opening and closing of the inlet, and wherein the second actuator and the third actuator are configured to control opening and closing of the at least three outlet. In another embodiment, the actuator assembly comprises: at least one engine connected with the at least two sensors, wherein the at least one engine controls an opening and a closing of the at-least three outlets; and one or more limit switches are connected to at-least one engine, wherein each limit switch controls an amount of power supplied to the at-least one engine.

In one embodiment, the at least one sensor is disposed at an exterior side of the reservoir containing the multi-phase fluid. In another embodiment, the at least three outlet comprises a first outlet, a second outlet and a third outlet, wherein the first outlet is configured to receive a first phase fluid, the second outlet is configured to receive a second phase fluid and the third outlet is configured to receive a third phase fluid. In another embodiment, the selective density of the at least two float marker is selected on the basis of densities of three fluids in the multi-phase fluid, wherein the at least two float marker comprises a first float marker and a second float marker, wherein the selective density of the first float marker is selected between the density values of first two consecutive fluids in the multi-phase fluid, and wherein the selective density of the second float marker is selected between the density values of second two consecutive fluids in the multi-phase fluid.

Another aspect of the present disclosure is directed to a method for automated decantation of a multi-phase fluid comprising: monitoring a stay period of a multi-phase fluid in a container through an electronic timer; activating a first actuator after a stay period, wherein the stay period is maximum time for separation of the multi-phase fluid into individual fluids on the basis of density, wherein the activation of the first actuator results in opening of an inlet; opening a first outlet by actuating a second actuator; disposing and collecting a first fluid phase through the first outlet into a first storage tank; detecting a position of a first float marker placed inside the container through a first sensor; estimating an error time through a delay element connected control board, wherein the error time is a delay period for which the first outlet valve is kept open to assure complete draining of the first fluid phase; closing the first outlet and opening the second outlet through the second actuator; and disposing and collecting a second fluid phase through the second outlet into a second storage tank.

In one embodiment, the method for automated decantation of a multi-phase fluid further comprising steps of: detecting a position of a second float marker placed inside the container through a second sensor; estimating an error time through a delay element connected control board, wherein the error time is a delay period for which the second outlet is kept open to assure complete draining of the second fluid phase; closing the second outlet and opening a third outlet through a third actuator; and disposing and collecting a third fluid phase through the third outlet valve into a third storage tank.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

The present invention generally relates to a decantation of a multi-phase fluid mixture and more particularly relates to an apparatus and method for providing improved automatic decantation of multi-phase chemical fluid.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
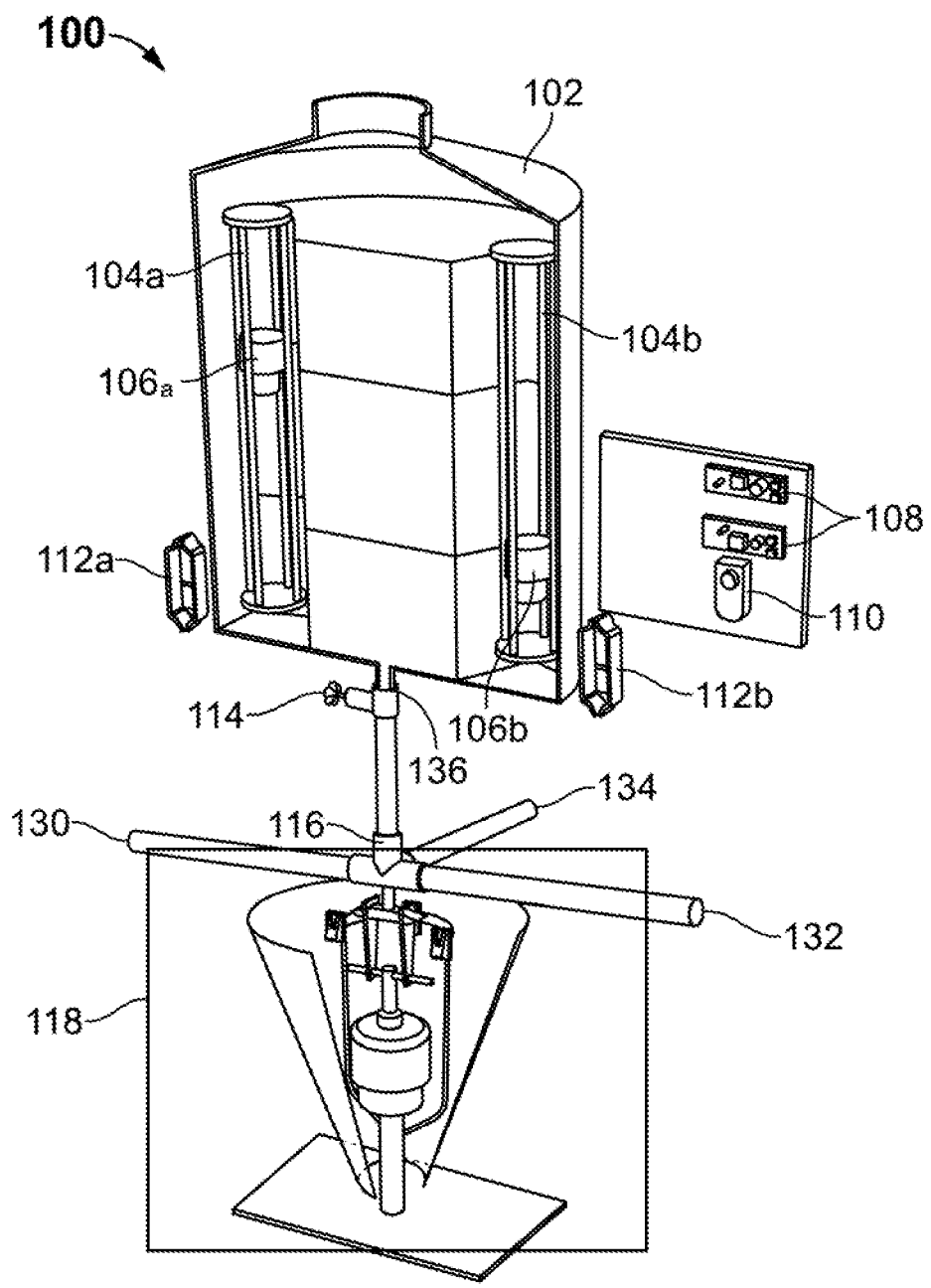
FIG. 1 exemplarily illustrates an apparatus for automated decantation of three-phase fluids according to an embodiment of the present invention.

Referring to FIG. 1, an apparatus 100 for automated decantation of three-phase fluids is illustrated, according to an embodiment of the present invention. The apparatus 100 comprises a fluid line assembly, at least two floating markers (106a, 106b), at least two vertical frames (104a, 104b), at least two sensors (112a, 112b), an actuating assembly including an actuating component 118, an electric board or a control board comprising a delay element 108, and a timer switch 110. The fluid line assembly is attached to a separating container 102 containing the multi-phase fluid, comprising an inlet 136 and at least three outlets (130, 132, 134).

The fluid line assembly comprises a three-way valve 116 disposed between the inlet 136 and the at least three outlets (130, 132, 134). At least one floating marker 106a is disposed within the at least one vertical frame 104a. At least one sensor or first sensor 112a is disposed in proximity to a bottom portion the at least one vertical frame 104a. The at least one sensor 112a is disposed at the exterior side of the separating container 102. The apparatus 100 further comprises a valve 114. At least one floating marker 106b is disposed within the at least one vertical frame 104b. At least one sensor or second sensor 112b is disposed in proximity to a bottom portion the at least one vertical frame 104b. The at least one sensor 112b is disposed at the exterior side of the separating container 102.

Figure 2:
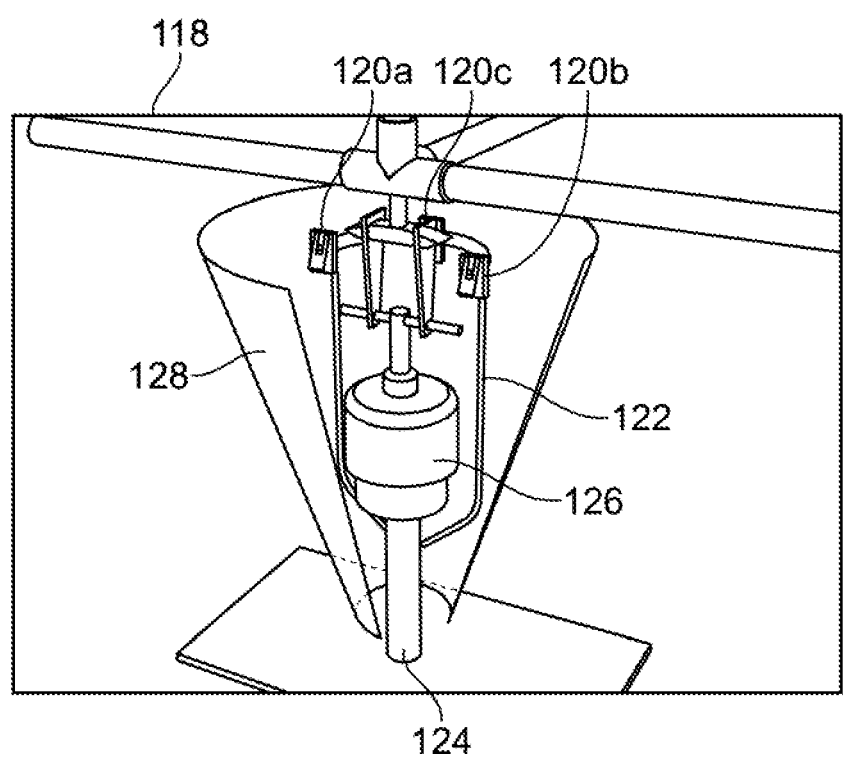
FIG. 2 exemplarily illustrates an actuating component of the apparatus for automated decantation of three-phase fluids of FIG. 1, according to an embodiment of the present invention.

Referring FIG. 2, the actuating assembly comprises the actuating component 118. In one embodiment, the actuating component 118 comprises a motor housing 128 encompassing an electric motor 126. The electric motor 126 is disposed on a motor holder 124. The actuating component 118 further comprises one or more limit switches or limit switches (120a, 120b, 120c) supported by a limit switch holder 122. The electric motor 126 configured to open or close at least three outlets (130, 132, 134) using gear and lever components.

Figure 3:
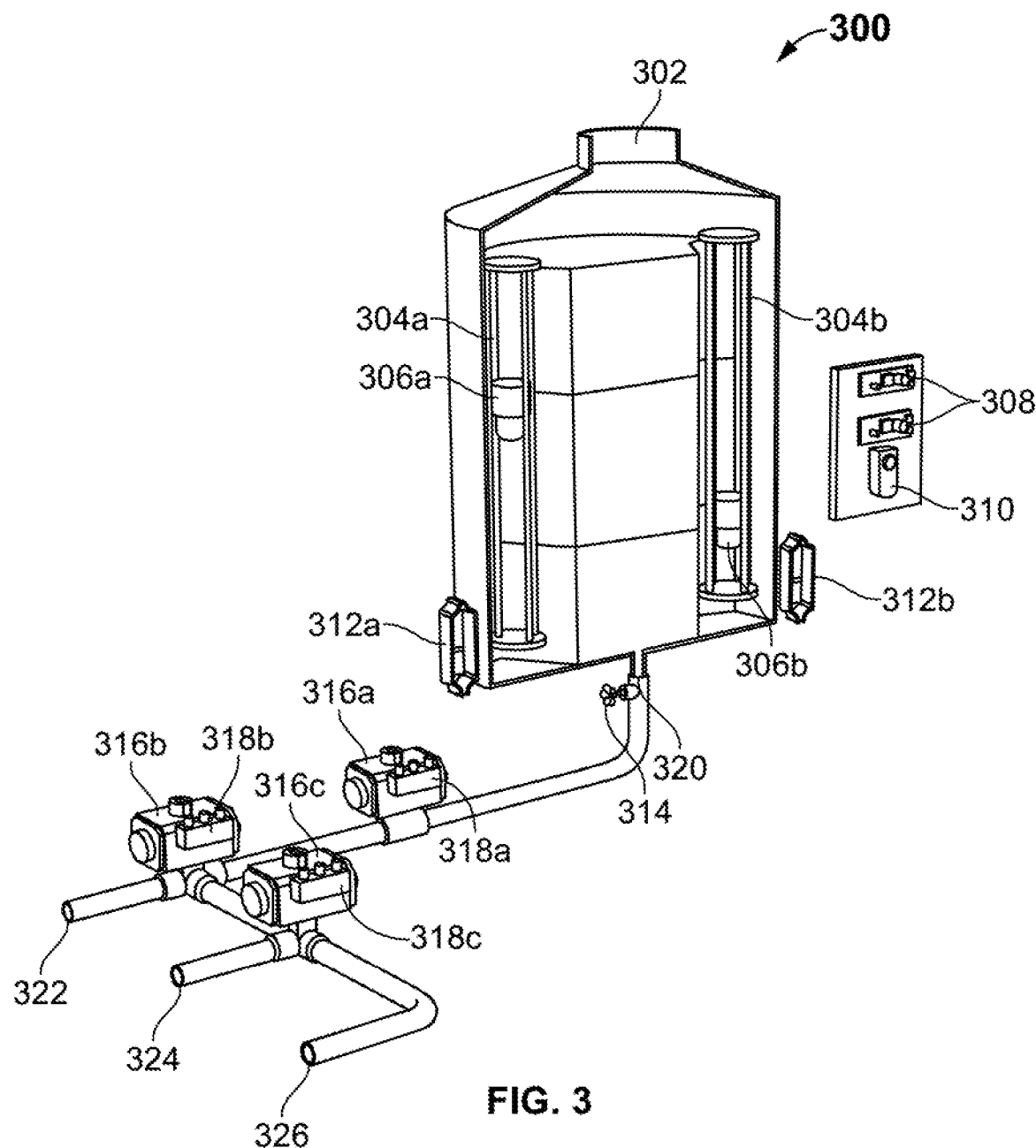
FIG. 3 exemplarily illustrates an apparatus for automated decantation of three-phase fluids according to another embodiment of the present invention.

FIG. 3 exemplarily illustrates an apparatus 300 for automated decantation of three-phase fluids according to another embodiment of the present invention. The apparatus 300 comprises a fluid line assembly, at least two float markers (306a, 306b), at least two vertical frames (304a, 304b), at least two sensors (312a, 312b), an actuating assembly, an electric board comprising a delay element 308, and a timer switch 310. The fluid line assembly is attached to a separating container 302 containing the multi-phase fluid, comprising an inlet 320 and at least three outlets (322, 324, 326) (hereinafter, also referred as, a first outlet 322, a second outlet 324 and a third outlet 326).

At least one float marker or first marker 306a is disposed within the at least one vertical frame or first frame 304a. At least one sensor or first sensor 312a is disposed in proximity to the at least one vertical frame 304a. The at least one sensor 312a is disposed at the exterior side of the separating container 302. At least one float marker or second marker 306b is disposed within the at least one vertical frame or second frame 304b. At least one sensor or second sensor 312b is disposed in proximity to the at least one vertical frame 304b. The at least one sensor 312b is disposed at the exterior side of the separating container 302.

The actuating assembly comprises at least three actuators (316a, 316b, 316c) (hereinafter, also referred as, a first actuator 316a, a second actuator 316b and a third actuator 316c). The first actuator 316a is disposed proximal to the inlet 320, the second actuator 316b is disposed proximal to the first outlet 322, and the third actuator 318c is disposed proximal to the second outlet 326. Each actuator (316a, 316b, 316c) comprises at least one solenoid valve (318a, 318b, 318c).

Figure 4:
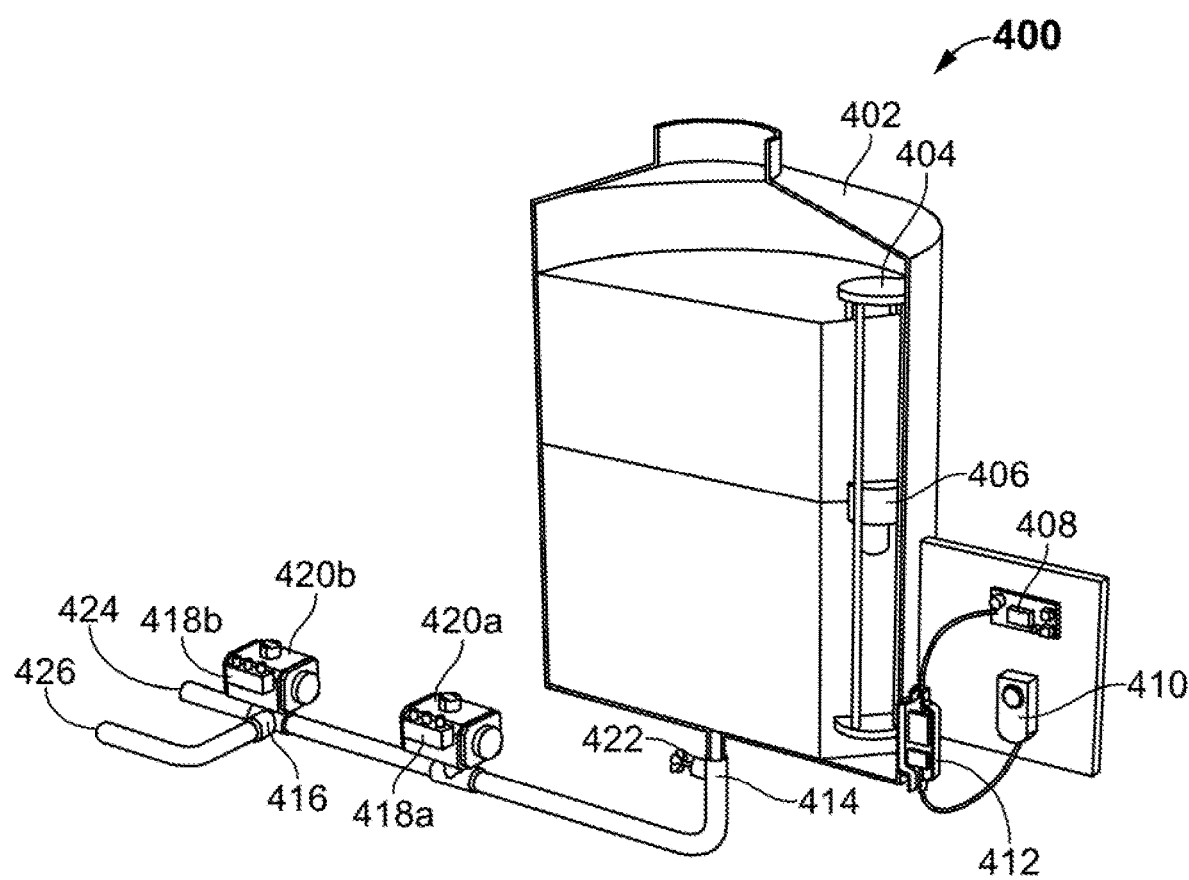
FIG. 4 exemplarily illustrates an apparatus for automated decantation of two-phase fluids according to an embodiment of the present invention.

FIG. 4 exemplarily illustrates an apparatus 400 for automated decantation of two-phase fluids according to an embodiment of the present invention. The apparatus 400 comprises a fluid line assembly, at least one floating marker 406, at least one vertical frame 404, at least one sensor 412, an actuating assembly, an electric board comprising a delay element 408, and a timer switch 410. The fluid line assembly is attached to a separating container 402 containing the multi-phase fluid, comprising an inlet 414 and at least two outlets (424, 426).

The fluid line assembly comprises a three-way valve 416 disposed between the inlet 414 and the at least two outlets (424, 426). At least one floating marker 406 is disposed within the at least one vertical frame 404. The at least one vertical frame 404 is disposed within the separating container 402 comprising the two-phase fluid. At least one sensor 412 is disposed in proximity to the lower position at least one vertical frame 404. The at least one sensor 406 is disposed at the exterior side of the separating container 402. The actuating assembly comprises at least two actuators (420a, 420b) (hereinafter, also referred as, a first actuator 420a, and a second actuator 420b). The first actuator 420a is disposed proximal to the inlet 414, and the second actuator 420b is disposed at the first outlet 424. Each actuator (420a, 420b) comprises a solenoid valve (418a, 418b).

Figure 5:
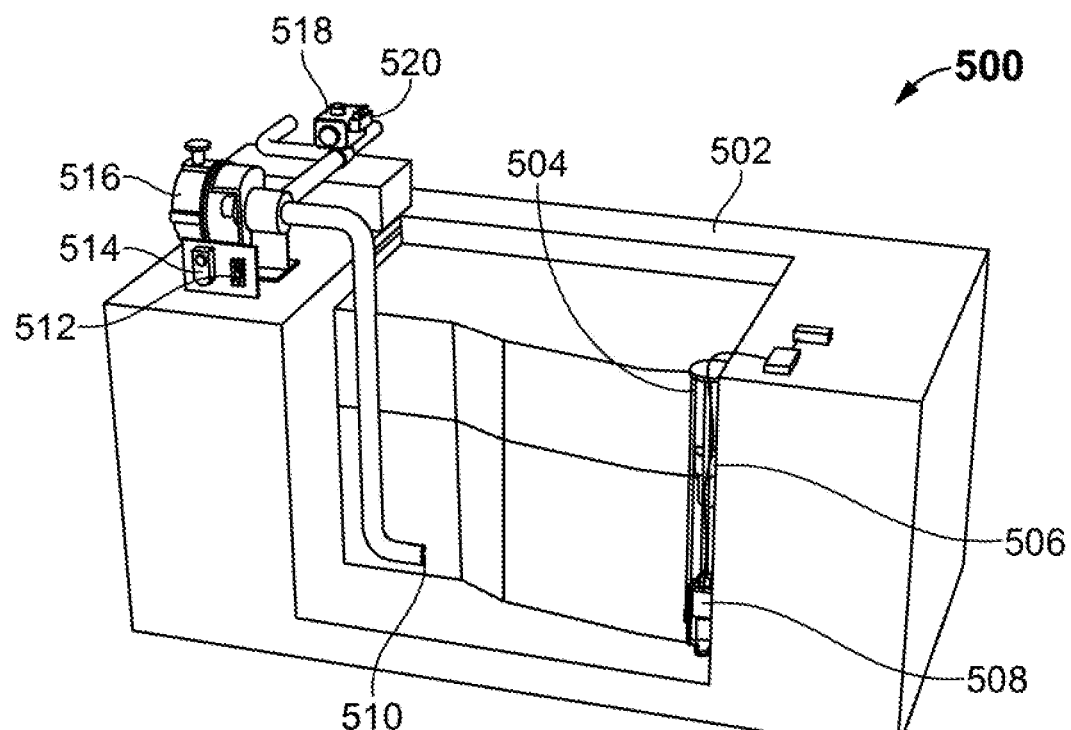
FIG. 5 exemplarily illustrates an apparatus installed at a waste water separating reservoir for automated decantation of two-phase fluids according to another embodiment of the present invention.

FIG. 5 exemplarily illustrates an apparatus 500 installed at a waste water reservoir 502 for automated decantation of two-phase fluids according to another embodiment of the present invention. The apparatus 500 comprises a fluid line assembly, at least one floating marker 506, at least one vertical frame 504, at least one sensor 508, an actuating assembly, an electric board comprising a delay element 512, and a timer switch 514.

Figure 6:
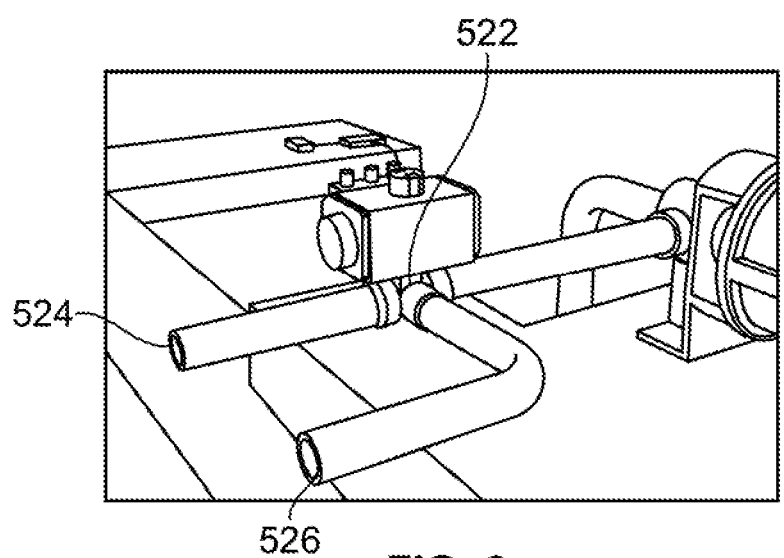
FIG. 6 exemplarily illustrates a three-way valve installed at the outline lines of apparatus of FIG. 5, according to an embodiment of the present invention.

Referring to FIG. 6 and FIG. 5, the fluid line assembly comprises a three-way valve 522 disposed between the inlet 510 and the at least two outlets (524, 526). At least one floating marker 506 is disposed within the at least one vertical frame 504. The at least one vertical frame 504 is disposed within the reservoir 502 comprising the two-phase fluid. At least one sensor 508 is disposed in proximity to the at least one vertical frame 504. The at least one sensor 508 is disposed below the at least one vertical frame 504. The apparatus 500 further comprises a pump 516 to evacuate fluid from the reservoir 502 through pumping.

The actuating assembly comprises at least one actuator 518 to control opening or closing of the at least two outlets (524, 526). In one embodiment, the actuating assembly comprises electronic valves to control opening or closing of the at least two outlets (524, 526). The at least two outlets (524, 526), also referred as, a first outlet 524 and a second outlet 526. The first outlet 524 is configured to receive a first phase fluid and the second outlet 526 is configured to receive a second phase fluid.

Figure 7:
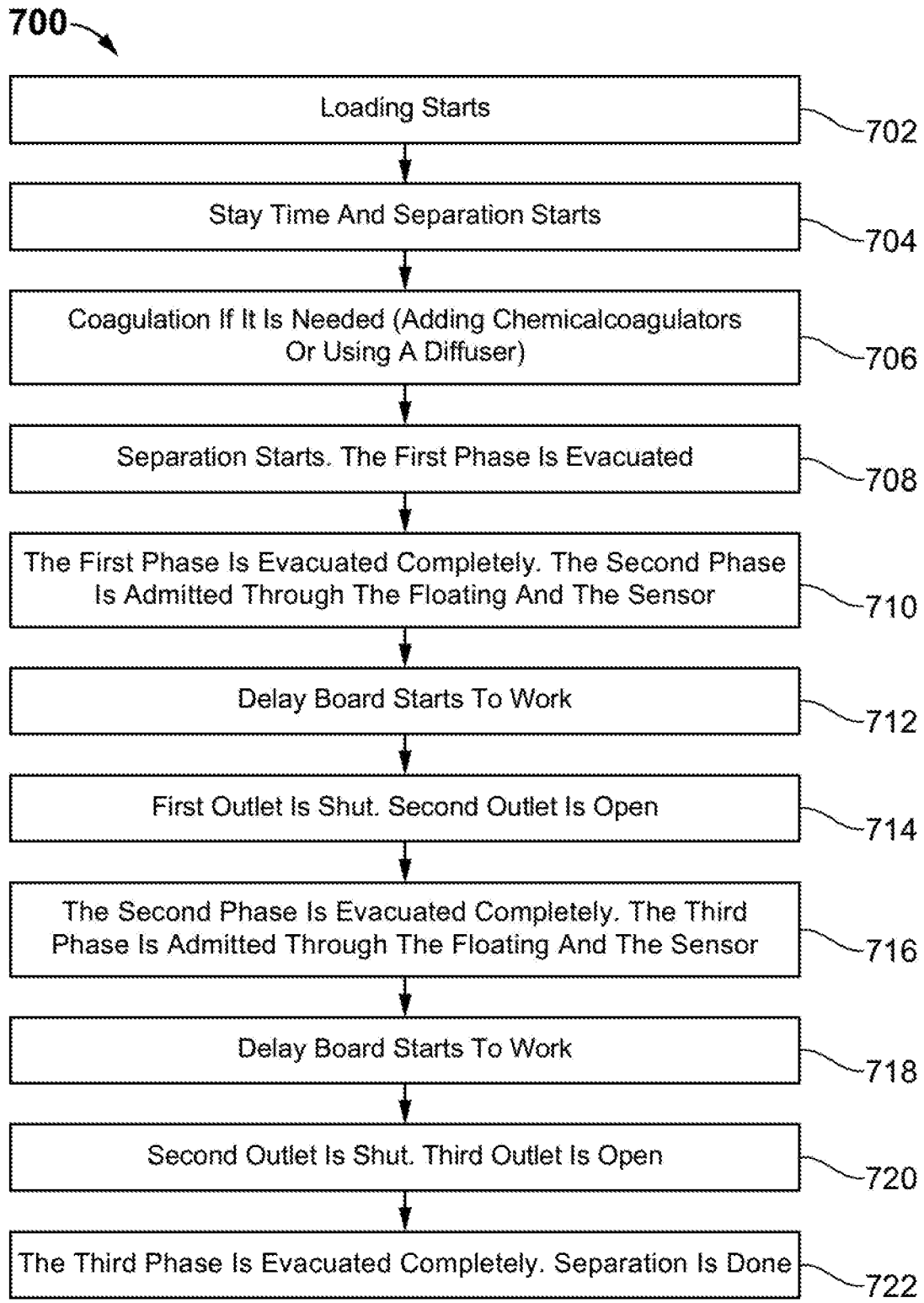
FIG. 7 exemplarily illustrates a flowchart of a method for automated decantation of three-phase fluids according to an embodiment of the present invention.

Referring to FIG. 7, a method 700 for automated decantation of multi-phase fluids according to an embodiment of the present invention. At step 702, the multi-phase fluid is filled in the reservoir. At step 704, wait for a stay period and separation of multi-phase fluid. The stay period is maximum time for separation of the multi-phase fluid mixture into individual fluids on the basis of density. At step 706, multi-phase fluid is separated using coagulation, for example, using chemical coagulators or diffuser.

At step 708, the fluid is separated into different phases. A first actuator is actuated after a stay period. The actuation of the first actuator results in opening of a first inlet. A first outlet is opened using a second actuator. The first fluid phase is disposed and collected through the first outlet into a first storage tank.

The position of the first float marker placed inside the container is detected through the at least one respective sensor. At step 712, an error time is estimated through a delay element connected control board. The error time is a delay period for which the first outlet valve is kept open to assure complete draining of the first fluid phase.

At step 714, the first outlet is closed, and a second outlet is opened through a second actuator. At step 716, the second fluid phase is disposed and collected through the second outlet into a second storage tank. The position of a second float marker placed inside the container is detected through at least one respective sensor. At step 718, an error time is estimated through a delay element connected control board, wherein the error time is a delay period for which the second outlet is kept open to assure complete draining of the second fluid phase. At step 720, the second outlet is closed, and a third outlet is opened through a third actuator. At step 722, the third fluid phase is disposed and collected through the third outlet valve into a third storage tank.

According to one embodiment herein, a method for automated decantation of two-phase fluids utilizing an apparatus is disclosed. The apparatus comprises a fluid line assembly, a floating marker, a sensor, an actuator assembly and a control board. The fluid line is attached to a reservoir containing the multi-phase fluid, comprising an inlet and at least two outlets. A three-way valve is disposed between the inlet and the at least two outlets. The sensor comprises a reed switch.

The floating marker is disposed within a cylindrical frame mounted within the reservoir. The cylindrical frame is configured to enable the floating marker to move vertically, the floating marker is of a selective density. The cylindrical frame is designed to make the float marker move vertically in a determined part. In one embodiment, the cylindrical frame could be manufactured in any shape.

The sensor is disposed in proximity to a bottom portion of the cylindrical frame. The sensor further comprises a reed switch. The sensor is disposed at an exterior side of the reservoir. In one embodiment, the reservoir is at least one of separating container or container. The control board further comprises a timer switch.

In one embodiment, the selective density of the float marker is selected on the basis of densities of two fluids in the multi-phase fluid mixture. The selective density of the float marker is selected between the density values of two fluids in the multi-phase fluid. Due to the density of the float marker and fluid, the float marker floats between the two fluid phases.

In one embodiment, the actuator assembly comprises at least two actuators. The at least two actuator comprises a first actuator and a second actuator. The first actuator is configured to control opening and closing of the inlet. The second actuator is configured to control opening and closing of the at least two outlets.

In another embodiment, the actuator assembly comprises at least one actuator to control opening and closing of the inlet and at least two outlets. In yet another embodiment, the actuator assembly comprises an actuating component. In one embodiment, the actuating component comprises a motor housing encompassing an electric motor. The electric motor is disposed on a motor holder. The actuating component further comprises one or more limit switches supported by a limit switch holder.

During operation, the multi-phase fluid is filled in the reservoir and wait for a stay period. The stay period is maximum time for separation of the multi-phase fluid mixture into individual fluids on the basis of density. The fluid is separated into different phases. In one embodiment, colloid or emulsion liquid could be coagulated and separated into phases using common methods such as applying chemical emulsifiers or diffusers. The fluid of first phase is evacuated via the first outlet. During evacuation of the fluid of first phase, the float marker towards the sensor. When the float comes in line with the sensor, the sensor activates the actuation assembly to open the second outlet and close the first outlet. But the actuation assembly are activated sooner than the time when the first phase is evacuated completely, hence the delay element starts to operate, when the float marker comes in line with the sensor.

The delay element is configured to calculate error time. The opening of the second outlet and the closing of the first outlet is delayed for the calculated error time, to ensure complete evacuation of fluid of first phase and to increase accuracy. After completion of the error time, the second outlet is opened for evacuation of fluid of second phase.

According to one embodiment herein, a method for decantation automated decantation of three-phase fluids utilizing an apparatus is disclosed. The apparatus comprises a fluid line assembly, at least two floating markers, at least two vertical frames, at least two sensors, an actuating assembly including an actuating component, an electric board or a control board comprising a delay element, and a timer switch. The fluid line assembly is attached to a reservoir containing the multi-phase fluid, comprising an inlet and at least three outlets. Each sensor comprises a reed switch.

In one embodiment, the at least three outlet comprises a first outlet, a second outlet and a third outlet. The first outlet is configured to receive a first phase fluid, the second outlet is configured to receive a second phase fluid and the third outlet is configured to receive a third phase fluid.

The fluid line assembly comprises a three-way valve disposed between the inlet and the at least three outlets. At least one floating marker is disposed within the at least one vertical frame. At least one sensor is disposed in proximity to a bottom portion the at least one vertical frame. The at least one sensor is disposed at the exterior side of the separating container. The cylindrical frame is designed to make the float marker move vertically in a determined part. In one embodiment, the cylindrical frame could be manufactured in any shape. The at least one sensor is disposed in proximity to a bottom portion of the cylindrical frame. The sensor further comprises a reed switch. The sensor is disposed at an exterior side of the reservoir. In one embodiment, the reservoir is at least one of separating container or container. The control board further comprises a timer switch.

In one embodiment, the selective density of the float marker is selected on the basis of densities of three fluids in the multi-phase fluid mixture. The at least two float marker comprises a first float marker and a second float marker. The selective density of the first float marker is selected between the density values of first two consecutive fluids in the multi-phase fluid, and the selective density of the second float marker is selected between the density values of second two consecutive fluids in the multi-phase fluid. Due to the density of the float marker and fluid, the first float marker floats between a first fluid phase and a second fluid phase. The second float marker floats between a third fluid phase and the second fluid phase.

In one embodiment, the number of float and the sensor increases with the increase with the number of phases to be separated. An example for the number of floating needed in a three-phase separation:

$$d = m/v$$

d phase (3)<d the second floating 2<d phase (2)<d the first floating 1<d phase (1). The above-mentioned equation can be used to calculate the density of floating in all systems. The density of the floating should make the floating stay between those phases.

In one embodiment, the actuator assembly comprises at least three actuators. The at least three actuator comprises a first actuator, a second actuator and a third actuator. The first actuator is configured to control opening and closing of the inlet. The second actuator and the third actuator are configured to control the opening and closing of the at least three outlets.

In another embodiment, the actuator assembly comprises at least one actuator to control opening and closing of the inlet and at least three outlets. In yet another embodiment, the actuator assembly comprises an actuating component to control opening and closing of the inlet and at least three outlets. In one embodiment, the actuating component comprises a motor housing encompassing an electric motor. The electric motor is disposed on a motor holder. The actuating component further comprises one or more limit switches supported by a limit switch holder.

In yet another embodiment, the actuator assembly comprises at least one engine connected with the at least two sensors. The at least one engine controls an opening and a closing of the at-least three outlets. one or more limit switches are connected to at-least one engine. Each limit switch controls an amount of power supplied to the at-least one engine.

In one embodiment, the apparatus further comprises a pump to evacuate fluid from the reservoir through pumping. In some industries it's more economic to do separation in their waste water basins, hence fluid phase could be evacuated through pumping from basins.

During operation, the multi-phase fluid is filled in the reservoir and wait for a stay period. The stay period is maximum time for separation of the multi-phase fluid mixture into individual fluids on the basis of density. The fluid is separated into different phases. The first actuator is actuated after a stay period. The actuation of the first actuator results in opening of the first inlet. The first outlet is opened using the second actuator. The first fluid phase is disposed and collected through the first outlet into a first storage tank.

The position of the first float marker placed inside the container is detected through the at least one respective sensor. An error time is estimated through a delay element connected control board. The error time is a delay period for which the first outlet valve is kept open to assure complete draining of the first fluid phase.

The first outlet is closed, and the second outlet is opened through the second actuator. The second fluid phase is disposed and collected through the second outlet into a second storage tank. The position of a second float marker placed inside the container is detected through at least one respective sensor. An error time is estimated through a delay element connected control board, wherein the error time is a delay period for which the second outlet is kept open to assure complete draining of the second fluid phase. The second outlet is closed, and the third outlet is opened through a third actuator. The third fluid phase is disposed and collected through the third outlet valve into a third storage tank.

The apparatus of the present invention could be used in separating chemical fluids and industrial immiscible waste water without any limitation in the number of phases. The apparatus is further configured to separate fluid phases of immiscible fluids of oil slicks, oil condensations and oily waste water on the surface of the sea and oily waste water produced by factories such as steel industry, glass, leather making, food industry, petro chemistry, petroleum and gas refining and fabrication. In small scale, the present invention could be used for separating liquid-liquid extraction, food and medicine separations which is done in laboratories.

The present invention could be directly attached to the reservoir containing immiscible fluid and eliminates the need to changing fluid to new separating containers for phase separation. The floating marker of the present invention is disposed within the cylindrical frame to make the sensor move in the sensor's area. The delay element of the present invention improves the accuracy level of fluid phase separation and could be used for all fluids with different viscosities. Further, the float marker won't stick to the sensor and after separation, the float marker would be on its place when the apparatus is restarted and the new fluid is in the containers/basins. So, there is no need for a mechanical force to separate the float marker and it is separated by the fluid's stream. Using electronic switch reeds improves the accuracy and the sensor could locate float marker in a further distance from the container or reservoir. Further, the design of the apparatus very adaptable enabling to add many options, e.g. using diffuser or adding chemicals to coagulate emulsions.

The apparatus increases the accuracy up to a high level because of adding an electronic board and the precise structure of the floating and the sensor. The program of evacuating the phases are adaptable. The phase separation could also be done in waste water basins. Re-starting apparatus is simplified and there is no need to a Syros or an electromotive force. The apparatus decreases the costs of operation and refining system. The least space is needed to install and operate the apparatus. There is no need for a professional Syros. The apparatus, method and the fabrication are simple. Continues and discontinues operation also provided by the apparatus. The apparatus also decreases the number of fabrication units in the refinery. It has the least problems of operation in comparison with the other methods.

The apparatus changes(decreasing) the number of exit valves of the separating container of industries to one valve and eliminating the remained layer of the multi-phase fluid in the containers. The delay connected electronic board improves the accuracy in separation. The cylinder frame makes the system capable to be used in large containers and removes errors resulted from horizontal movements of the floating. Changing sensors method of construction by using reed switches resulted in more accurate and sensitive sensors. The present invention comprises simplify restarting mechanism so there is no need to electromotive force or a sysop. The apparatus is controlled by a timer switch without any sysop and introduces an accurate solution to have a coherent separation system.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions.

Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A method for automated decantation of a multi-phase fluid comprising:
   monitoring a stay period of a multi-phase fluid in a container through an electronic timer;
   activating a first actuator after a stay period, wherein the stay period is maximum time for separation of the multi-phase fluid into individual fluids on the basis of density, wherein the activation of the first actuator results in opening of an inlet;
   opening a first outlet by actuating a second actuator;
   disposing and collecting a first fluid phase through the first outlet into a first storage tank;
   detecting a position of a first float marker placed inside the container through a first sensor;
   estimating an error time through a delay element connected control board, wherein the error time is a delay period for which the first outlet is kept open to assure complete draining of the first fluid phase;
   closing the first outlet and opening the second outlet through the second actuator; and
   disposing and collecting a second fluid phase through the second outlet into a second storage tank.

2. The method for automated decantation of a multi-phase fluid of claim 1, further comprising steps of:
   detecting a position of a second float marker placed inside the container through a second sensor;
   estimating an error time through a delay element connected control board, wherein the error time is a delay period for which the second outlet is kept open to assure complete draining of the second fluid phase;
   closing the second outlet and opening a third outlet through a third actuator, and
   disposing and collecting a third fluid phase through the third outlet into a third storage tank.

* * * * *